United States Patent [19]
Neimat et al.

[11] Patent Number: 6,012,059
[45] Date of Patent: Jan. 4, 2000

[54] METHOD AND APPARATUS FOR REPLICATED TRANSACTION CONSISTENCY

[75] Inventors: Marie-Anne Neimat, Atherton; Kurt Shoens, Los Altos, both of Calif.; Oded Shmueli, Nofit, Israel

[73] Assignee: Dataxel Corporation, Menlo Park, Calif.

[21] Appl. No.: 08/918,686

[22] Filed: Aug. 21, 1997

[51] Int. Cl.[7] .................................................. G06F 17/30
[52] U.S. Cl. ................... 707/8; 707/10; 707/200; 707/201
[58] Field of Search ........................... 707/8, 200, 201, 707/10

[56] References Cited

U.S. PATENT DOCUMENTS

| 5,170,480 | 12/1992 | Nohan et al. | 707/201 |
| 5,287,496 | 2/1994 | Chen et al. | 707/8 |
| 5,313,629 | 5/1994 | Abraham et al. | 707/201 |
| 5,390,316 | 2/1995 | Cramer et al. | 395/425 |
| 5,423,037 | 6/1995 | Hvasshovd | 707/8 |
| 5,440,727 | 8/1995 | Bhide et al. | 395/444 |
| 5,555,404 | 9/1996 | Torbjornsen et al. | 707/8 |
| 5,577,240 | 11/1996 | Demers et al. | 707/8 |
| 5,586,310 | 12/1996 | Sharman | 707/8 |
| 5,621,795 | 4/1997 | Baker et al. | 380/21 |
| 5,701,480 | 12/1997 | Raz | 395/671 |
| 5,708,812 | 1/1998 | Van Dyke et al. | 395/712 |
| 5,737,601 | 4/1998 | Jain et al. | 707/201 |
| 5,758,337 | 5/1998 | Hommond | 707/8 |
| 5,781,910 | 7/1998 | Gostanian et al. | 707/201 |
| 5,796,999 | 8/1998 | Azagury et al. | 707/8 |
| 5,806,075 | 9/1998 | Jain et al. | 707/201 |
| 5,809,503 | 9/1998 | Aoshima | 707/8 |

*Primary Examiner*—Thomas G. Black
*Assistant Examiner*—Frantz Coby
*Attorney, Agent, or Firm*—Marger Johnson & McCollom

[57] ABSTRACT

Local transactions are run at replication sites while receiving and tracking replication packages from primary sites. If a package coming in from a primary site updates data that a local transaction used, the data is considered stale and the local transaction is restarted. When the replication site wishes to commit (e.g., update data at the primary sites), a special dummy marker is submitted and committed. The marker comprises a dummy transaction that updates a piece of data at the primary site private to the replication site. The local site waits for the dummy transaction in the stream of replication packages sent from the primary site. Once the dummy transaction is received, the replication site is assured that any subsequent replication packages from the primary site will not affect the local transaction. If the replication packages received before the marker do not affect data items referenced during the local transaction, the local transaction commits.

21 Claims, 5 Drawing Sheets

METHOD AND APPARATUS FOR REPLICATED TRANSACTION CONSISTENCY

BACKGROUND OF THE INVENTION

This invention relates generally to systems that use database replication and more particularly to a system that provides replicated transaction consistency. Replicated transaction consistency means that concurrent transactions accessing the primary and replicated data get the same results that they would get if they were executed serially and without the presence of the replicas.

Replicated database systems include the Sybase Replication Facility, manufactured by Sybase Inc., Emeryville, Calif. and described in the Sybase Replication Server Manual. The replicated system utilizes one or more primary database sites and local replication sites. Selected portions of the primary database are copied to the local sites and used by local transactions running at the local replication sites. Each primary site contains the authoritative copy for a portion of the data. For each data item in a local replica, only one primary site contains the authoritative copy. Transactions running at the replication sites may examine the replica data contained at the replication site itself, examine primary data stored at one or more primary sites, or examine both replica and primary data.

Data items held at a replication site are not locked at the primary site, other than for a short time while data is initially copied from the primary to the replication site. All updates performed by local transactions are transparently relayed to the primary sites. The replication sites receive permanent updates via update notifications from the primary sites.

Data replication facilities are based on subscriptions placed by the replication sites on the primary sites. Each subscription names a primary site table and an optional predicate to select primary site tuples for replication. When a transaction commits at a primary site, updates are sent to each replication site with a matching subscription. The updates sent to each replication site are transmitted in packages. Each package corresponds to a single primary site update transaction. The packages are sent from the primary site to the replication sites in commit time order. For example, if transaction T1 commits before transaction T2, the package for T1 will be sent before the package for T2.

Replication systems typically provide no guarantee of timeliness for transmitting the packages. In general, the replication system is expected to transmit update packages in a timely manner, but the transmission can be delayed arbitrarily by system load, network congestion, etc. Transactions that run against the replicated data cannot determine when data items were last part of a committed state for the primary database. Therefore, if precautions are not taken, a transaction might act upon versions of data that are no longer current.

Traditional solutions to the replication consistency problem apply to remote buffering of database pages. A combination of locking and update notification keep remote buffer pools consistent. To conduct a local transaction, global locks are placed on objects that are read during transaction execution. The global locks guarantee the proper synchronization with cache invalidation or cache update protocols that execute when data is updated.

An article entitled: Asynchronous Locking, IBM Technical Disclosure Bulletin, 1985 by Kurt Shoens, discloses a method of arbitrating global locks in a shared-disk cluster. The locks discussed in Shoens are requested and granted asynchronously using Lamport's logical clocks to establish correct ordering of global events. Shoens retains an abbreviated lock history at a master site that is consulted to see if a lock could have been granted at the time it was requested. The lock history consists of an unlock time stamp per lock name plus a global time stamp indicating how far back the lock history extends. Unlike a usual lock manager, the lock manager has to be able to tell whether a lock could have been granted at some time in the past.

In a replication environment, it is not practical to use locks on referenced data items. Locks typically apply to the physical structures of a database system. To determine which locks correspond to particular data items, most of the access protocol must be run at the primary server. Controlling all data access from the primary site removes the scaling advantage that replicated database systems offer.

An article entitled: Efficient Optimistic Concurrency Control Using Loosely Synchronized Clocks, Proceedings SIGMOD Conference, 1995, A. Adya, R. Gruber, B. Liskov, and U. Maheshwari, describes an implementation of optimistic concurrency control using loosely synchronized physical clocks. A distributed transaction wishing to commit is subjected to serial validation at each site that contributed data, regardless of the degree of contribution or whether the site was read-only to the transaction. More site validation is required as the number of replication sites increase. Thus, the system cannot be scaled to operate efficiently with a large number of replication sites.

Thus, a need remains for ensuring transaction consistency for replicated data systems while maintaining effective access and update response at each primary and replication site.

SUMMARY OF THE INVENTION

Local transactions are run at replication sites while receiving and tracking replication packages from the primary sites. If a package coming from a primary site updates data used during a local transaction, the data is considered stale and the local transaction is restarted. A local transaction wishing to update replica data must do so via transactions opened on each primary site. The local transactions are committed only after the local transaction conducts a commit analysis. If the commit analysis shows that replication packages from the primary site do not affect any data items referenced during the local transaction, the local transaction is committed.

When the replication site wishes to commit (e.g., make updates permanent at the primary sites), a single record "V" shared by all replicas at each primary site is modified via the transaction already opened at each primary site. The exact form of the modification is immaterial; it is sufficient to increment an integer column in the record "V." Thus, the validation phase of the replica transactions is necessarily serialized. Forcing the update to the record "V" prevents two local sites from performing validation at the same time.

Then, the replica site submits a special dummy marker transaction to each site and commits it. The dummy marker comprises a dummy transaction that updates a piece of data at the primary site private to the replication site. The local site waits for the dummy transaction to return in the stream of replication packages sent from the primary site. Once the dummy transaction is received, the replication site is assured that any subsequently received replication packages do not affect data referenced during the local transaction. If the replication packages received before the marker do not affect data items referenced during the local transaction, the local transaction commits.

If changes can be made to the primary site database system, alternative implementations are possible. These alternatives permit the replica site to establish the current point in time among the replication packages received from the primary sites. One such method is to assign sequence numbers to each replication package and to support a new request that allows a replica to discover the sequence number of the latest replication package queued or sent to the replica. When that package is received, the replica is certain that it has all the information necessary to make a decision.

Another possible implementation is to add a new request to the primary site database system that queues a dummy replication package with a sequence number chosen by the replica. The dummy replication package serves the same purpose as the replication package caused by the dummy transaction, but avoids the overhead of creating an extra transaction.

Identifying data used by the local transaction is made at various levels of granularity. For low update frequencies, granularity is set at the level of whole tables. If whole table granularity is selected, the replication sites track a set of tables "S" referenced by the local transaction. The replication site then determines whether any of the replication packages update any of the tables in "S". For higher update frequencies, finer levels of granularity are implemented such as specific groups within a selected table.

Committed local transactions are applied through the primary site to the replicated data. Thus, the local transaction will eventually see its own changes to the replicated data via replication packages. When the local transaction terminates, the changes made to the replica are backed out. If the local transaction managed to commit, then the same changes are reapplied to the replica through the primary site.

Thus, multiple replication sites can access any portion of the primary data in a synchronized manner that ensures transaction consistency with multiple replicas of the primary database. Replica transactions executed with the previously described mechanism operate as if they were executed serially, one by one, at the primary site.

The foregoing and other objects, features and advantages of the invention will become more readily apparent from the following detailed description of a preferred embodiment of the invention which proceeds with reference to the accompanying drawings.

DETAILED DESCRIPTION

Figure 1:
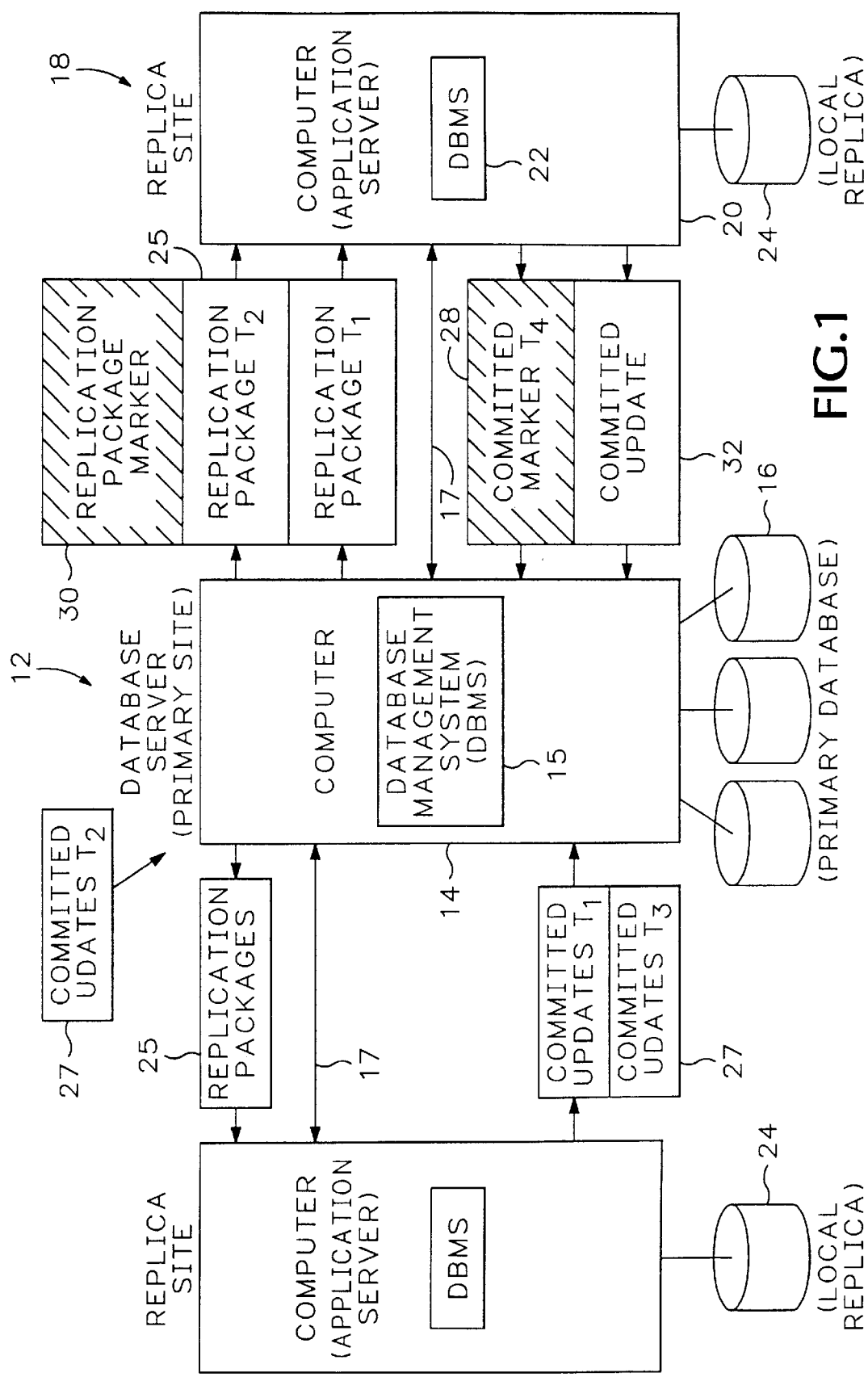
FIG. 1 is a diagram of a replicated database system according to the invention.

Referring to FIG. 1, a replicated database system includes at least one primary site 12, such as a database server. The server 12 includes a computer 14 for accessing a primary database 16 through a database management system (DBMS) 15. Multiple replication sites 18 each include an application server coupled to the database server, for example, via a local area network 17. A computer 20 in the application server accesses a local replicated database 24 through a local DBMS 22. The local replica 24 comprises a copy of a portion of the primary database 16. Database systems and applications run on commercially available servers, such as the Hewlett-Packard 9000 series. Database systems with replication capabilities include Sybase SQL Server, commercially available from Sybase Inc., Emeryville, Calif.

In this invention, the actual updates to the primary site data are performed through ordinary database transactions. In addition, the invention creates an additional ordinary database transaction, called the "dummy transaction," to synchronize events in the replicated system. In the following description, the term "transaction scope" is used to refer to a database transaction implemented either on the primary site or on a replica site.

Each replication site 18 conducts transactions that either reference or generate updates to the local replica 24. In order to incorporate local transaction updates into the primary database 16 and the local replica 24, the replication site 18 must send a committed update 27 to primary site 12. The primary site DBMS 15 commits the update to the primary database 16 and then sends replication packages 25 that update each replication site affected by the update.

Figure 2:
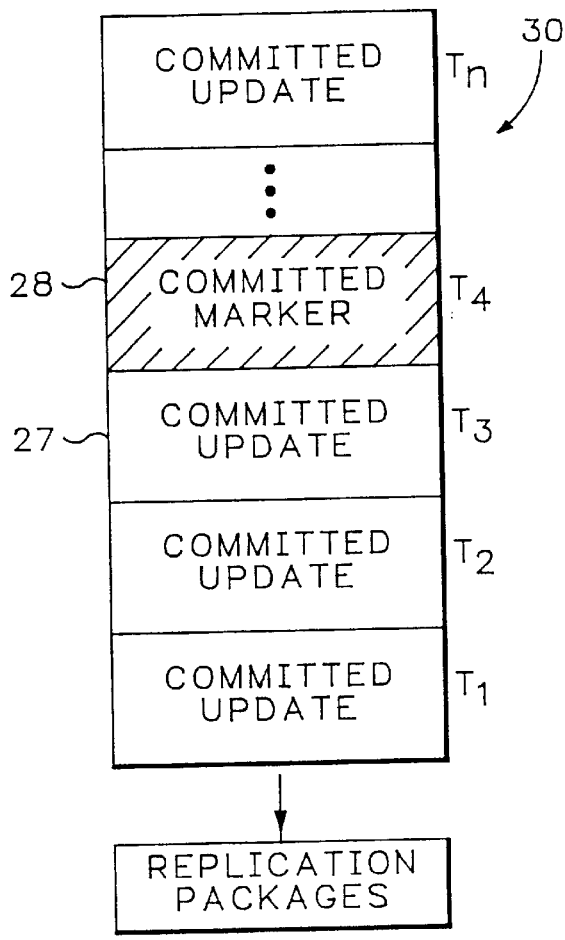
FIG. 2 is a diagram of an update queue for a database management system at a primary site.

FIG. 2 shows an update queue 30 used by the DBMS 15. The update queue 30 presents the committed updates from the replication sites 18 in commit time order. For example, a committed transaction T1 is sent by a replication site 18, a committed transaction T2 is sent later in time by another replication site, a committed transaction T3 is sent after T3, etc. Transaction T1 is committed first at primary site 12 (T1) and will be the first update in the primary database 16. The T1 updates are then output as replication packages to each replication site 18 having a subscription to the updated data items. The next committed transaction received in the update queue 30 (T2) is processed and associated replication packages sent to the replication site subscribers.

More than one replication site may affect the same data in the primary database at the same time. Thus, a local transaction may modify or reference a data item that no longer exists or has changed values in the primary database 16.

To serialize updates from different replication sites, a dummy transaction marker 28 is sent from the replication sites 18 to the primary sites 12. The local transaction waits for the marker to return through a replication package 30 before sending a committed update 32 to the primary site. The marker provides a timeline reference point for identifying when replication packages were updated in the primary database 16. Replication packages received before the replication package marker 30 reflect committed updates to the primary database 16 occurring before completion of the local transaction. The replication packages received after the replication package marker 28 reflect committed updates to the primary database occurring after completion of the local transaction.

Figure 3:
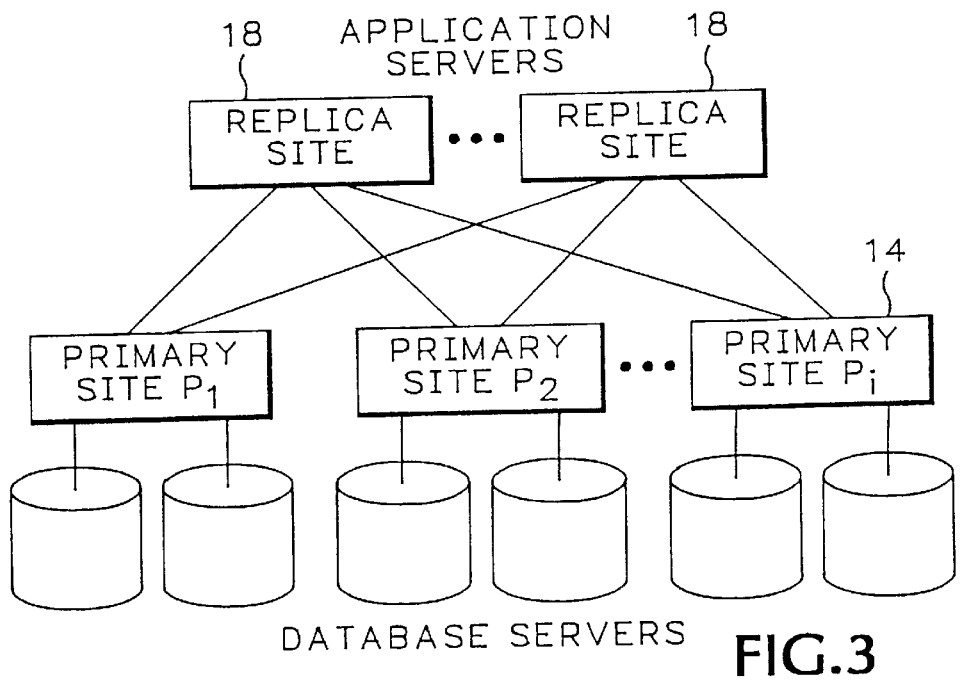
FIG. 3 is a replicated database system with multiple primary sites according to another embodiment of the invention.

Referring to FIG. 3, the invention is adaptable to replicated systems having multiple primary sites (P1, P2, . . . Pi). Each primary site 14 is accessible by any one of the replication sites 18. Each local transaction tracks which primary sites send replication packages 25. Markers 28 (FIG. 1) are committed to each tracked primary site 14 as described below.

Figure 4:
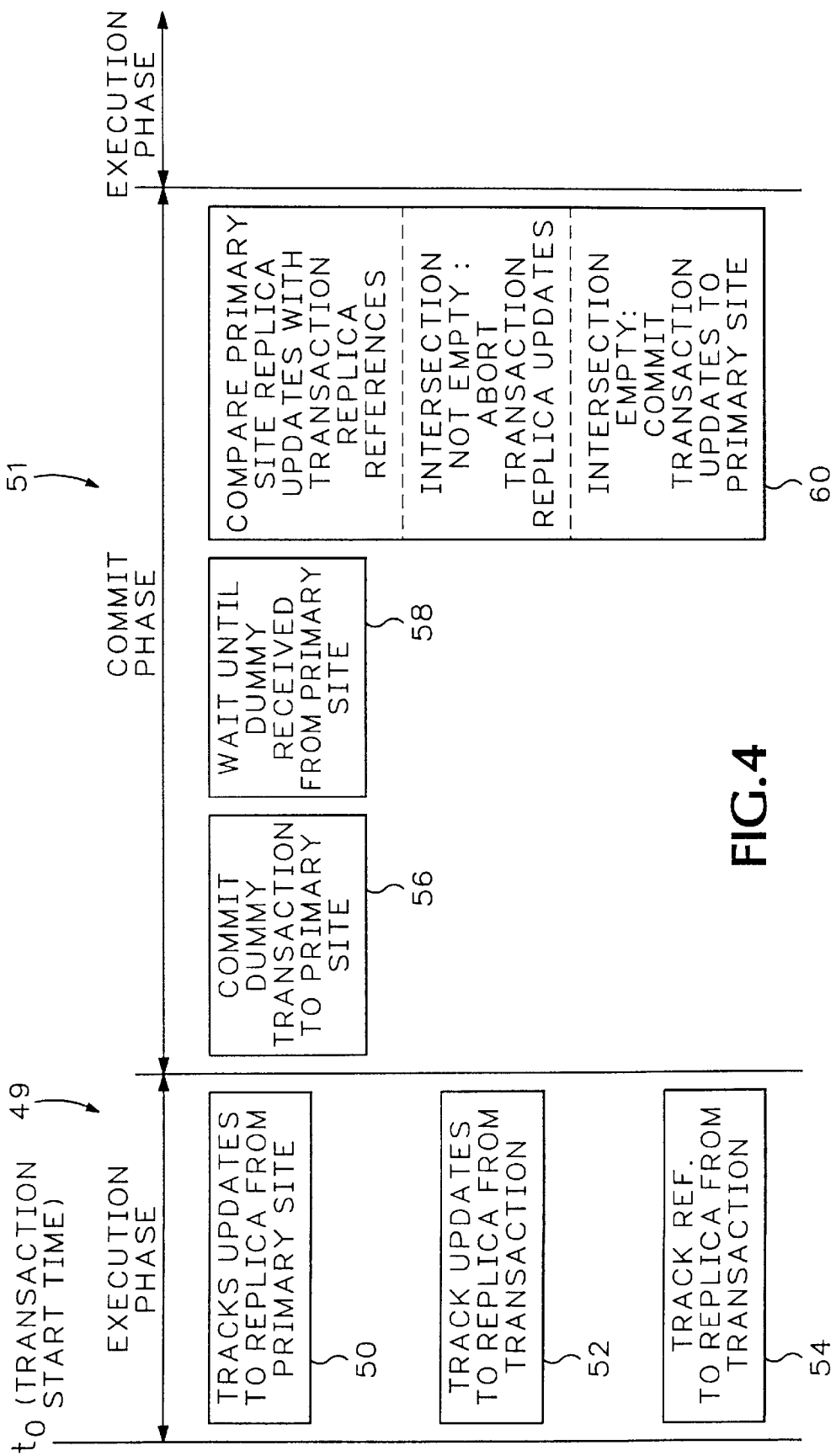
FIG. 4 is a timeline diagram for a replication site transaction.

FIG. 4 is a timeline diagram showing the sequence of events that occur during a local transaction at the replication site 18 (FIG. 1). The transaction begins an execution phase 49 at time $t_0$. During the execution phase 49, module 50 tracks replication package updates sent to the local replica 24 from different primary sites. Module 52 tracks updates to the local replica 24 made by the local transaction and module 54 tracks references to the local replica 24 by the local transaction.

After the execution phase 49 has completed, the transaction begins a commit phase 51. During the commit phase, a module 56 commits a dummy transaction 28 to each identified primary site 12. An important feature of the invention is that a separate dummy transaction can be sent to each primary site. A single distributed transaction is not required to be sent to all primary sites. Thus, the primary sites do not need to support distributed transactions. Module 58 then waits for a replication package 25 from each identified primary site 12 that includes the committed marker 28.

If changes can be made to the back-end database system, alternative implementations are possible. One possibility is to assign monotonically increasing numbers to transactions. Then, a new database system request called Identify would return the transaction number of the latest transaction sent to this replica. After the replica receives the indicated transaction, it knows that it has seen enough of the replication stream to make the correct commit decision. For this technique, the identified transaction conveys its updates as well as performing the functions of the marker transaction. In low update environments, the Identify call will often return a transaction number that has already been received by the replica, which means that no further waiting is necessary before committing the replica transaction.

Another possible database enhancement is to add a new request to the back-end database system that places a marker record directly in the replication stream. This new request, called Marker, takes a single parameter that is an identifying value chosen by the replica site. When the back-end database system receives the Marker request, it places a special record in the outgoing replication stream that is identified as a marker and contains the identifying value presented by the replica site. The special record can be identified by the replica site and used in place of the dummy transaction to establish the current point in time in the replication stream.

Module 60 identifies which data items were updated by the replication packages 25 prior to receiving the dummy transaction 28. The identified data items are compared with the list of data items in the local replica referenced by the local transaction. If any of the data items updated by the replication packages coincide with data items referenced by the local transaction, the local transaction updates to the local replica 24 are aborted. If none of the data items are the same, the local transaction is committed to the primary sites 12. The replication site 18 then begins the execution phase 49 for the next transaction.

Figure 5:
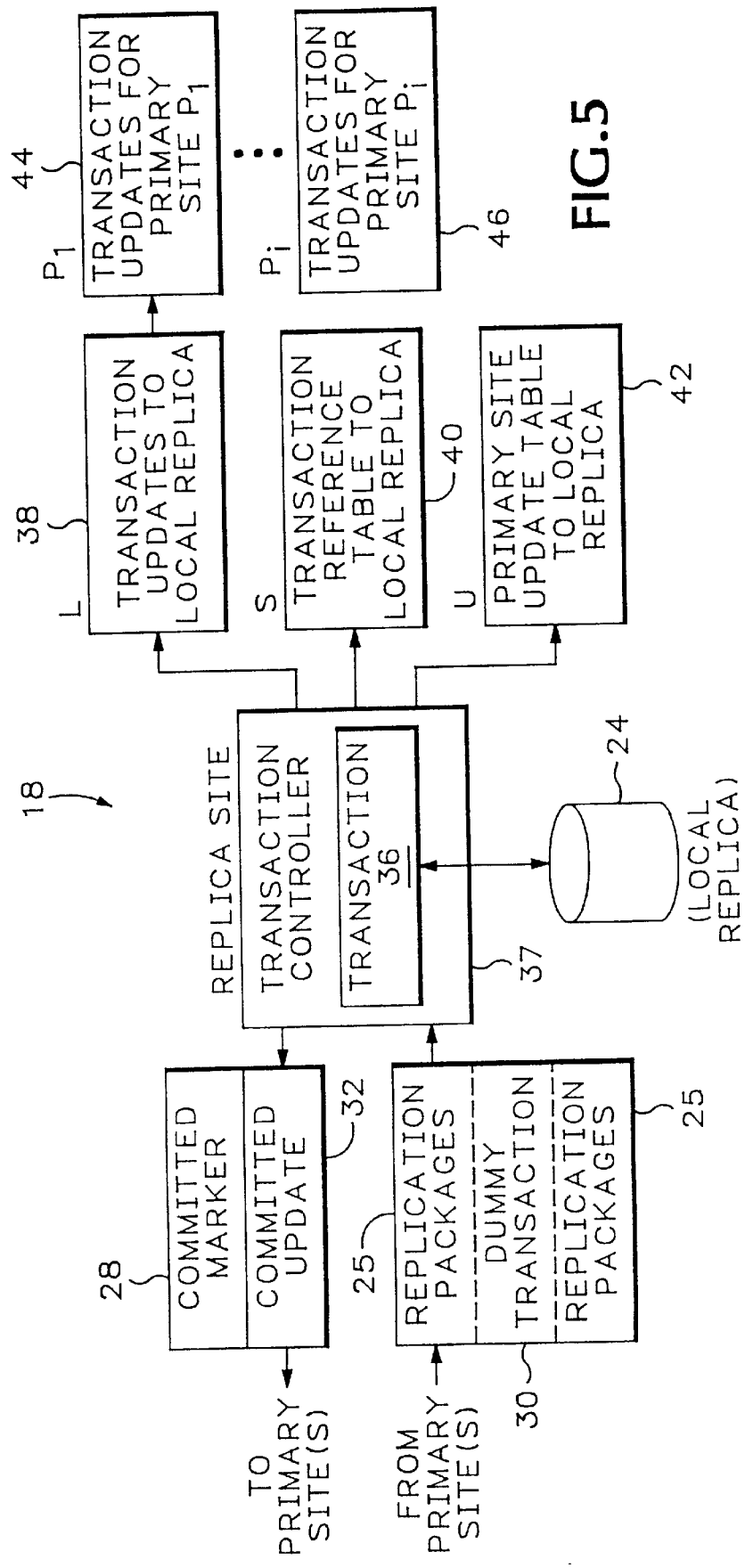
FIG. 5 is a detailed data flow diagram for the replication site.

FIG. 5 is a data flow diagram for each replication site 18. A transaction 36 accesses local replica 24. A transaction controller module 37 controls the transmission of the committed dummy marker 28 and the committed updates 32 to the primary sites 14. The transaction controller also receives and tracks replication packages 25 from the primary sites 14.

A transaction scope "L" 38 stores all temporary updates to local replica 24 by the local transaction 36. A transaction scope "Pi" 46 stores the temporary updates according to which one of the primary sites 12 contain the primary data item. A data structure "S" 40 tracks each table referenced by the local transaction 36. A data structure "U" 42 tracks each table updated in the local replica 24 by a replication package 25.

Figure 6:
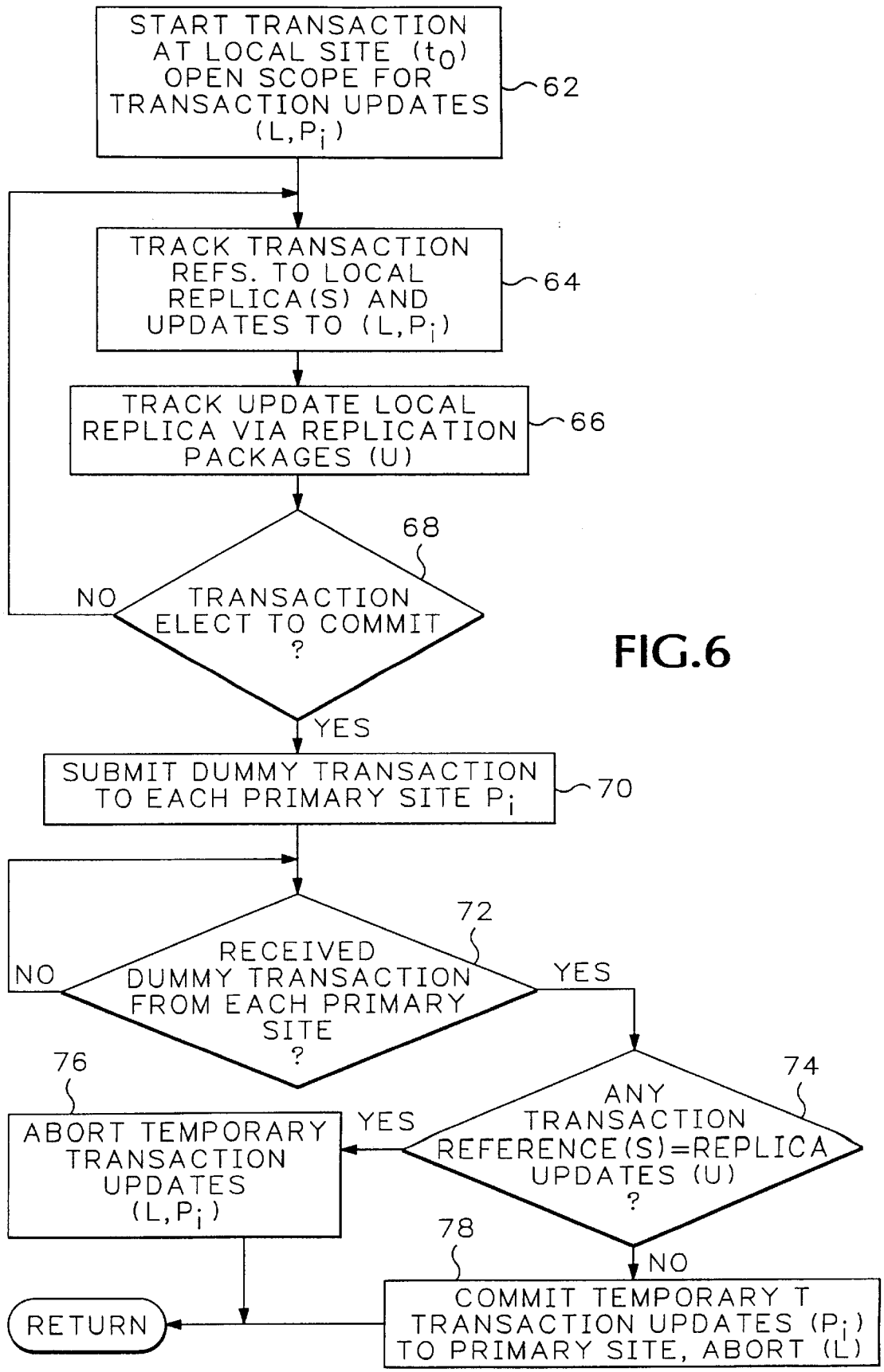
FIG. 6 is a step diagram showing the steps performed by the replication site.

FIG. 6 is a step diagram showing the steps performed by the replication site 18. Step 62 starts the transaction at time $t_0$, opens the transaction scope "L" for storing the temporary updates to the local replica, and opens the scopes "Pi" for each primary site 12. If additional primary sites are identified during the transaction, additional "Pi" scopes are opened.

Step 64 tracks the set "S" of tables that the transaction references during the execution phase 49 (FIG. 4). As the local transaction 36 makes updates, step 64 applies the updates through transaction scope "Pi" and through "L". Updates made to the Pi are protected by the underlying database system concurrency controls. Step 66 applies replication package updates to the local replica 24. In addition, step 66 tracks the set "U" of tables updated through the replication packages since $t_0$. Decision step 68 loops through steps 64 and 66 until the transaction is ready to begin the commit phase 51 (FIG. 4).

When the transaction elects to commit, step 70 submits and commits the dummy transaction 28 to each primary site 12 referenced in transaction scopes "Pi." Just before submitting the dummy transaction, the record "V" is updated at the primary site. The dummy transaction 28 updates a row in the primary database 16 private to the replication site and sets a column to a monotomically increasing unique value. Decision step 72 waits for the dummy transaction including the unique row and column values committed in step 70.

Decision step 74 determines whether the intersection of set "S" (local transaction references) and set "U" (replication package updates) is empty. If so, step 78 commits the transaction by committing each "Pi" and aborting "L". If the intersection of sets "S" and "U" is not empty, step 76 aborts the transaction by aborting each "Pi" and aborting "L". The transaction can then be rerun with the updated local replica.

The synchronization provided by the dummy transactions guarantees the replication sites an interval of time when local transaction updates are serialized. This temporary serialization ensures consistent updates to the primary and replicated data.

Another embodiment of the invention provides different grained resolution for detecting conflicts between local transactions and primary site updates. For example, rather than checking for conflicts at the table level, conflicts are checked at the predicate level. If the transaction examines department tuples for departments numbered 10 through 20, updates to departments outside this range do not affect the transaction.

The invention also supports lower levels of transaction isolation. An article written by H. Berenson, P. Bernstein, J. Gray, J. Melton, E. O'Neil, and P. O'Neil, entitled: Critique of the ANSI SQL Isolation Levels, Proceedings SIGMOD Conference, 1995, describes database applications that run with levels of isolation called snapshot isolation and cursor stability. These isolation levels can be realized in the environment of this invention.

Snapshot isolation can be realized by removing the step that modifies the shared record "V." The advantage of accepting snapshot isolation is that replica transactions can be validated in parallel, achieving improved system throughput.

Cursor stability can be realized through the use of synchronized physical or logical clocks. Logical clocks are discussed in detail in the article entitled: Time, Clocks, and the Ordering of Events in a Distributed System, Communications of the ACM, 21, 7, June 1978, L. Lamport.

To explain further, assume that physical clocks are synchronized within a maximum skew of "K". At each replication site for each local transaction, two values are tracked for each replica table: "C" is defined as the number of times the table is locked by local transactions, and "Z", the time at which "C" last dropped to zero. Each package of updates from a primary site is marked with the time "E" that the primary transaction committed. The value "E" may be approximate if the underlying replication system does not time stamp the packages. In such a case "E" may be any time before the transaction actually committed.

An update to a tuple received from a primary site conflicts with the local transaction if either C>0 for the table involved or E<Z-K. The local transaction may commit unless another transaction committed a value while the transaction was looking at it.

The invention can also rely on a triggering mechanism rather than a replication mechanism. In such systems, actions are associated with update activities against the database through the use of triggers. The trigger mechanism is used to simulate replication information, with a small difference: triggers are executed synchronously with the update transaction rather than after its commit. Since it is likely that the updates indicated by the trigger will eventually commit, the same dummy marker notification scheme described above is utilized.

It is of significant importance that the same ordering constraint placed on the replication data must also be implemented in the trigger implementation. This constraint can be met via a communication "pipe" mechanism that provides FIFO ordering of messages. Thus, a dummy transaction trigger is still used as a marker to guarantee that all needed information has been viewed at the replication site.

The trigger notifications cannot be used to update replication sites, since it is not known whether the updates will commit. The trigger information is used to invalidate replicated data and prevent future transactions from seeing it. To support reduced levels of consistency, the transaction identity is determined for each update and the commit or abort event is captured to find the commit time stamp for the transaction.

Thus, the invention provides transaction guarantees on replicated data not available in current database management systems. The invention is adaptable in any replicated data system including caching systems, where the cached copies are viewed as replicas. The invention can be implemented without modifying an existing database system that provides replication or trigger infrastructure.

Global consistency is realized among the replication sites, even if the primary sites do not support global consistency. The invention provides a more efficient messaging protocol than existing methods that require round-trip messages for lock acquisition as the transaction runs. In contrast, the invention only requires a message to submit the dummy transaction at commit time in addition to the usual two-phase commit messages used in a distributed transaction.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A method for conducting transactions on replica data items replicated from a primary site, comprising:
   initiating a local transaction on the replica data items;
   referencing the replica data items with the local transaction;
   generating updates to the replica data items from the primary site, the updates occurring independently of the local transaction;
   identifying which replica data items were updated at the primary site during the local transaction;
   committing the local transaction to the primary site when the local transaction references to the replica data items occur independently of identified replica data items updated from the primary site;
   establishing a reference point in time when data items are updated at the primary site by;
   committing a dummy transaction to the primary site;
       identifying one of the updates from the primary site returning the dummy transaction; and
       identifying a set of primary site updates occurring from the initiation of the local transaction to reception of the dummy transaction; and
   committing the local transaction only when replica data items referenced by the local transaction are not updated from the primary site before the reference point.

2. A method according to claim 1 wherein the step of committing the dummy transaction comprises modifying one of the replica data items with a unique identifier for the local transaction.

3. A method for conducting transactions on replica data items replicated from multiple primary sites, comprising:
   initiating a local transaction on the replica data items;
   referencing the replica data items with the local transaction;
   generating updates to the replica data items from the multiple primary sites, the updates occurring independently of the local transaction;
   tracking local transaction updates according to which one of the primary sites generated the replica data items;
   identifying which replica data items were updated by each one of the tracked primary sites during the local transaction by;
   committing a dummy transaction to each one of the primary sites;
   waiting for the dummy transaction updates from each one of the primary sites; and
   identifying all updates from the primary sites that occur from initiation of the local transaction to reception of all dummy transactions; and
   committing the local transaction to the tracked primary sites when the local transaction references to the replica data items occur independently of identified replica data items updated from the multiple primary sites.

4. A method for conducting transactions on replica data items replicated from a primary site, comprising:
   initiating a local transaction on the replica data items;
   referencing the replica data items with the local transaction;
   generating updates to the replica data items from the primary site, the updates occurring independently of the local transaction;
   identifying during the local transaction which replica data items were updated at the primary site;

establishing a reference point in time when data items are updated at the primary site; and committing the local transaction only when replica data items referenced by the local transaction are updated from the primary site after the reference point.

5. A method according to claim 1 wherein establishing the reference point comprises the following steps:

assigning numbers in sequence for each update to the replica data items made at the primary site;

requesting the numbers from the primary site; and committing the local transaction when the requested numbers have previously received by the local transaction.

6. A method according to claim 1 wherein establishing a reference point comprises the following steps:

requesting a marker with the local transaction;

placing the marker in updates to the replica data items from the primary site; and identifying a set of primary site updates occurring from the initiation of the local transaction to reception of the marker.

7. A method according to claim 1 including the following steps:

storing a set of temporary replica data items updated by the local transaction;

committing the set of temporary updates to the primary site when the local transaction commits; and aborting the set of temporary updates when the local transaction references coincide with the primary site updates.

8. A methods according to claim 1 including the following steps:

generating the replica data items from multiple primary sites;

tracking local transaction updates according to which one of the primary sites generated the replica data items; and identifying which replica data items were updated by each one of the tracked primary sites during the local transaction.

9. A method according to claim 1 wherein updated replica data items are identified using triggers for each replica data item updated by the local transaction.

10. A method according to claim 1 including the following steps:

providing a record at the primary site; and modifying the record before committing the local transaction for serializing transaction validation among the replica sites.

11. A method according to claim 1 including the following steps:

temporarily storing local transaction updates to the replica data items in a transaction scope;

tracking each local transaction reference to the replica data items in a first list;

tracking each primary site update to the replica data items in a second list; and committing the first transaction scope to the primary site when the first and second lists comprise independent replica data items.

12. A method according to claim 11 including aborting the first transaction scope when the first and second lists include common replica data items.

13. A replicated data system, comprising:

at least one primary site for storing a database, the primary site generating replication packages reflecting updates to portions of the database;

at least one local site connected to the primary site, the local site storing a local replica of at least a portion of the database and conducting local transactions with the local replica; and the local site generating a marker after each local transaction and waiting for receipt of the marker from the primary site before committing each local transaction thereby identifying which of the replication packages affected the local replica during the local transaction.

14. A system according to claim 13 wherein the local site includes a local update transaction scope for temporarily storing local transaction updates to the replica data.

15. A system according to claim 13 wherein the primary site comprises a database file server and the local site comprises an application server coupled to the database file server with a local area network.

16. A system according to claim 13 wherein the local site includes a reference transaction scope for tracking each local transaction reference to the replica data.

17. A system according to claim 13 wherein the local site includes a primary update transaction scope for tracking each primary site update to the replica data.

18. A method for conducting local transactions on replica data copied from a primary database, comprising:

generating replication packages for updating data items in the replica data;

conducting a transaction that references the replica data;

establishing a reference point when data items are updated at the primary database; and committing the local transaction to the primary database when the replication packages generated prior to the reference point do not update the data items referenced during the transaction.

19. A method according to claim 18 including the following steps:

temporarily storing local transaction updates to the replica data items in a transaction scope;

tracking each local transaction reference to the replica data items in a first list;

tracking each primary site update to the replica data items in a second list;

committing the transaction scope to the primary site when the first and second lists comprise independent replica data items; and aborting the transaction scope when the first and second lists track common portions of the replica data.

20. The method according to claim 18 wherein establishing a reference point includes the following steps:

committing a marker to the primary database at the end of the transaction;

identifying one of the replication packages containing the marker; and committing the transaction to the primary database when the replication packages generated prior to the marker do not update the data items referenced during the transaction.

21. A method according to claim 18 wherein the step of committing a marker comprises generating a trigger to the primary database.

* * * * *